United States Patent [19]

Raufeisen

[11] Patent Number: 4,674,402
[45] Date of Patent: Jun. 23, 1987

[54] APPARATUS FOR THAWING, RETARDING, AND PROOFING BAKERY GOODS

[75] Inventor: Frank Raufeisen, Oregon, Wis.

[73] Assignee: Standex International Corporation, Salem, N.H.

[21] Appl. No.: 724,002

[22] Filed: Apr. 17, 1985

[51] Int. Cl.⁴ .................. H05B 1/00; A21C 13/00
[52] U.S. Cl. ........................ 99/468; 99/474; 99/476; 99/483; 219/362; 219/401; 312/236
[58] Field of Search .............. 99/467, 468, 473–475, 99/470, 483; 219/401, 333, 362, 273; 126/369, 348, 20; 34/151; 261/26–29, DIG. 46

[56] References Cited

U.S. PATENT DOCUMENTS

| | | | |
|---|---|---|---|
| 4,373,340 | 2/1983 | Allen | 99/468 |
| 4,483,243 | 11/1984 | Cote | 99/468 |
| 4,579,051 | 4/1986 | Berrens | 99/468 |

*Primary Examiner*—Timothy F. Simone
*Attorney, Agent, or Firm*—Isaksen, Lathrop, Esch, Hart & Clark

[57] ABSTRACT

A bakery apparatus (15) is disclosed which has air heaters (32) and (33) for thawing frozen bakery goods, refrigeration enclosures (42) and (43) with cooling coils (40) for retarding the cure of bakery goods, a boiler (52) located within the apparatus cabinet (16) near the bottom thereof and a proofing air heater (57) located near the top of the cabinet, both the boiler and the proofing air heater being used for proofing bakery goods prior to baking. Front fans (44) are provided for circulating the air within the apparatus cabinet (16) during thawing and retarding. During proofing air is circulated from the proofing air heater (57) downwardly to the boiler (52) where it picks up moisture and then is circulated upwardly over the bakery goods within the apparatus without leakage of water from the boiler over the bakery goods, and with minimal condensation of water within the duct (64). Controls are provided to control the air heaters (32) and (33), the refrigeration compressor (36), the proofing air heater (57) and the heating elements (55) to maintain desired temperatures during thawing, retarding, and proofing and to maintain the desired humidity during proofing. After the operator shuts off the proofing controls, the apparatus continues to operate for a selected flushing time during which water is alternately supplied and drained from the boiler pan (54) to flush away residue in the pan and on the heating block (56). A method for thawing, retarding, and proofing bakery goods without disturbing the goods therebetween is also disclosed.

46 Claims, 7 Drawing Figures

U.S. Patent Jun. 23, 1987 Sheet 1 of 3 4,674,402
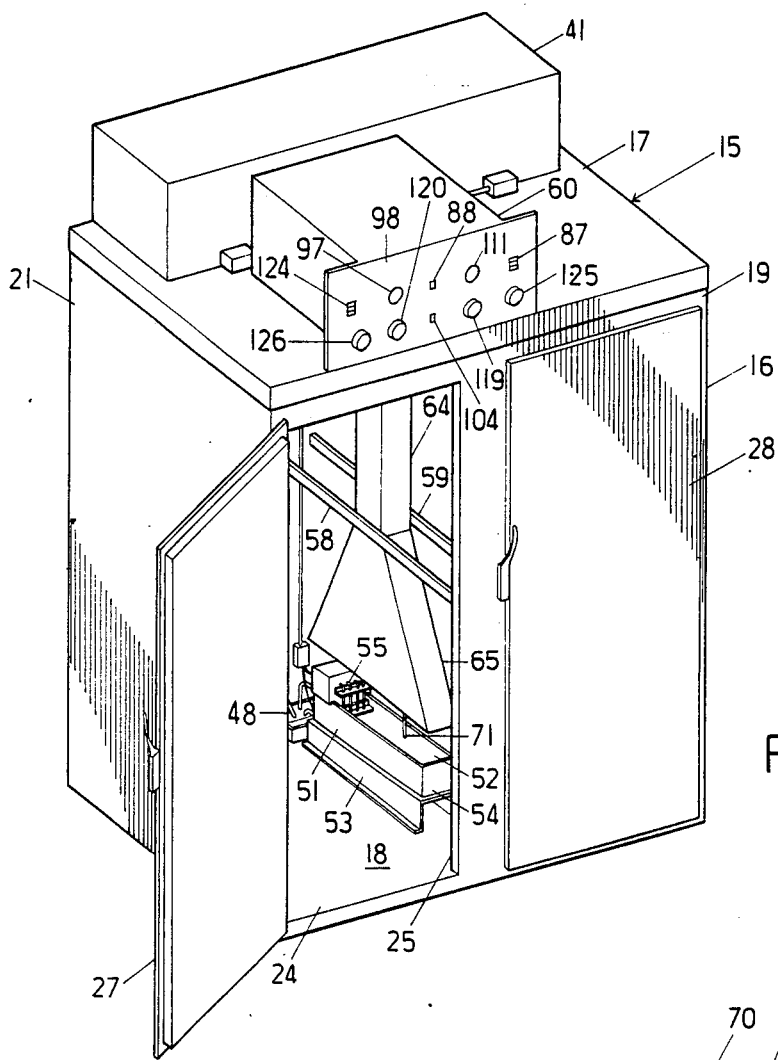
FIG. 1
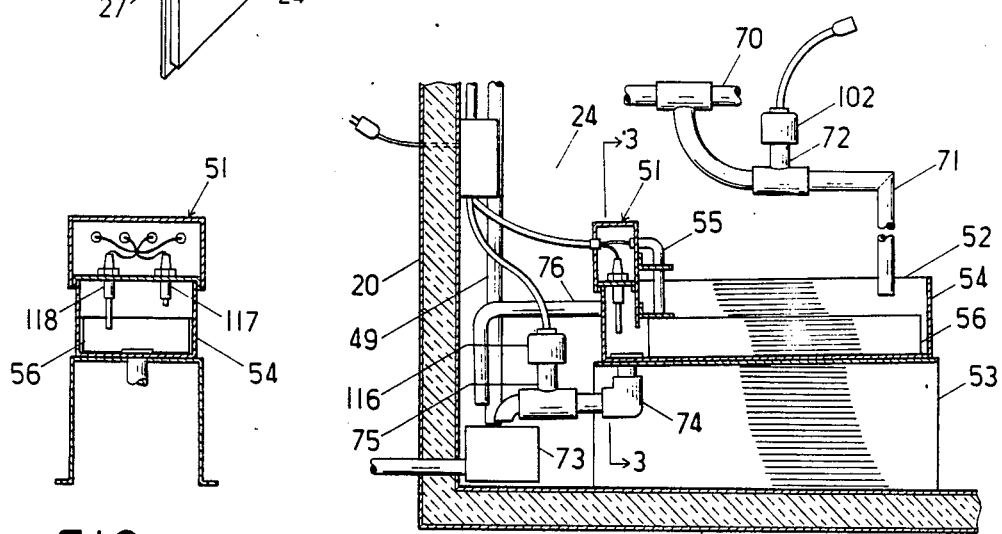
FIG. 3
FIG. 2

APPARATUS FOR THAWING, RETARDING, AND PROOFING BAKERY GOODS

BACKGROUND ART

Bakers, particularly those which mass produce bakery goods, often mix and form the dough for those goods well before baking. The dough is then frozen for future use. Before such frozen dough can later be baked, it must first be thawed and cured. Because it is desireable for bakery goods to cure only shortly before baking begins, the curing of any frozen dough thawed well before baking time, as well as any unfrozen dough mixed well before baking time, is commonly retarded by refrigeration. In any case, the curing is conventionally accomplished in an apparatus separate from thawing or retarding devices and a transfer of the bakery goods is necessary before curing begins.

Controlled thawing has in some cases been accomplished in thawer-retarder units which initially provide a moderately elevated temperature to thaw the frozen dough, and then maintain a "retard" temperature at which curing of the thawed dough is retarded. Such units typically include a heating system for thawing the frozen dough and a refrigeration system for maintaining a retard temperature, normally only slightly above zero degrees centigrade. Where a thawing time can be predicted, automatic timers can be used for switching the unit from its heating phase to its refrigeration phase.

After thawing, after any necessary retarding, but before the dough is baked, the bakery goods must normally be transferred for an appropriate time to a bakery proofer for curing. Transfer is normally accomplished by the removal of trays of bakery goods from racks within the retarder and placement of those trays upon racks within the proofer. Larger bakeries position the trays on wheel-mounted carts which may be transferred in their entirety from the retarder or thawer to the proofer. Carts increase the handling efficiency of the transfer operation; but in any case, such transfer represents a labor intensive step during which the bakery goods are exposed to ambient conditions within the bakery.

Proofers typically provide an enclosed atmosphere of a selected temperature and humidity in which the dough can cure or rise. Good proofing is a function of time, temperature and humidity. Conventional proofers have a steam generating unit and an air heater both located together outside the proofer interior. These proofers have experienced moisture and temperature control problems. Moreover, the droplets of condensation formed within the air handling sections of some proofers undesirably wetten the curing bakery products.

The most troublesome problem in conventional proofers is the continuing deposit of mineral residue within the steam generating system. The accumulation of such deposits adversely affects steam generation and consequently the humidity control within the system. Some steam generating designs provide for flushing the boiler during start-up. But frequent manual scouring of the steam generating equipment is often the only effective residue control measure.

SUMMARY OF THE INVENTION

The bakery apparatus of the present invention functions to thaw, retard, and proof bakery dough with minimal operator assistance and precise control over temperature and humidity and the sequencing of conditions applied to the dough. A heating unit is provided to thaw frozen baked goods; a refrigeration unit is provided for maintaining the bakery goods at a retard temperature; and an air heating and humidification system is provided for proofing the baked goods. Use of the apparatus of this invention thus makes transfer of the bakery goods between thawing and proofing unnecessary, and the frozen dough entering the unit is made oven ready.

The apparatus of the present invention has a steam generator unit advantageously positioned within the interior of the apparatus cabinet. This minimizes the amount of steam which must be generated during the proofing phase and consequently the amount of residue produced. Moreover, the boiler pan of the steam generator is located near the cabinet floor so that the air circulation pattern within the proofer conveys moistened air directly to the curing bakery goods. This maximizes the humidity in the air which reaches those goods. Placement of the boiler pan near the floor also eliminates much of the condensation experienced within the conduits of conventional proofers, minimizes wetting of the bakery goods by droplets of condensation, and facilitates the monitoring, draining and cleaning of the boiler pan itself.

The bakery apparatus of this invention also incorporates a unique boiler pan flushing system. The boiler pan is flushed for a selected period of time after the completion of each proofing phase such that the residue is flushed from the pan before it has set and while the pan and the water heating element are changing dimensions due to temperature fluctuations. This post-proofing flush cycle is extremely effective in reducing the amount of manual maintenance required to keep the steam generator free from significant residue build-up.

Further objects, features and advantages will be apparent from the following detailed description when taken in conjunction with the accompanying drawings showing a preferred embodiment of a bakery apparatus constructed in accordance with the invention.

BRIEF DESCRIPTION OF THE DRAWINGS

In the drawings:

FIG. 1 is a perspective view of a bakery apparatus constructed in accordance with the invention with one access door open to disclose the boiler pan therein.

FIG. 2 is a central longitudinal section through the boiler pan.

FIG. 3 is a transverse section taken generally along line 3—3 in FIG. 2.

DESCRIPTION OF THE PREFERRED EMBODIMENT

Figure 4:
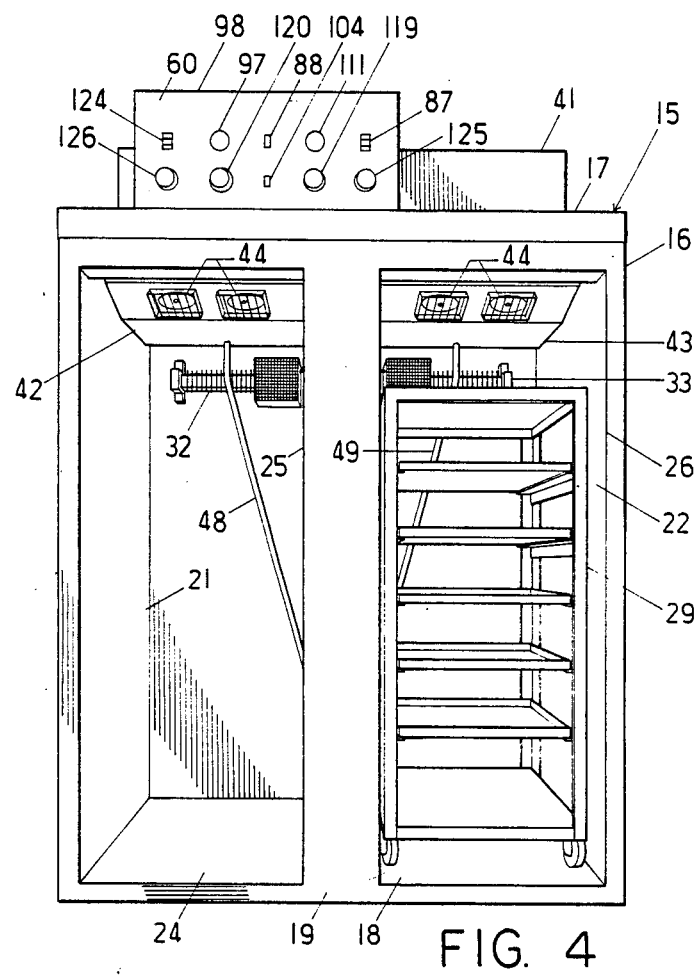
FIG. 4 is a frontal point perspective view of a bakery apparatus constructed in accordance with the invention with its access doors removed to disclose the heating units used for thawing, the refrigeration units used for retarding and a shortened wheel-mounted cart situated within.

Referring now more particularly to the drawings wherein like numerals refer to like parts throughout the several views, a preferred emobdiment for a bakery apparatus in accordance with the invention is shown generally at 15 in FIGS. 1 and 4.

The bakery apparatus 15 has a cabinet 16 which has a top wall 17, a floor 18, a cabinet front wall 19, a cabinet rear wall 20, and opposed cabinet end walls 21 and 22, all preferably having insulation therein. The cabinet front wall 19, the cabinet rear wall 20 and the cabinet end walls 21 and 22 shall be collectively referred to as cabinet side walls. Cabinet side walls 19, 20, 21 and 22 extend between the top wall 17 and the floor 18 to define an interior cabinet space 24. Doorways 25 and 26 are provided in the front wall 19 as a means for accessing the cabinet space 24 from outside the cabinet 16 so that items such bakery goods may be moved in and out of the bakery apparatus 15. While two front doorways are utilized in the preferred embodiment, it is understood that any number of access ways could be provided in the cabinet side walls in conformance with this invention. The doorways 25 and 26 are respectively provided with access doors 27 and 28 which are hingedly attached to the front wall 19. The doors 27 and 28 are moveable between an open position as shown on the left-hand side of FIG. 1 and a closed position as shown on the right-hand side of FIG. 1. Typically, each door of the apparatus will accommodate placement of a tray rack (not shown) or a tray cart 29 (shown in FIG. 4) within the cabinet space 24.

The preferred bakery apparatus 15 has thawing means for thawing frozen bakery goods, retarding means for retarding the cure of unfrozen bakery goods, and proofing means for proofing bakery goods prior to baking. The thawing means is adapted to provide a selected thawing temperature to bakery goods within the apparatus, and includes at least one thawing heater, preferably of the electrical resistance-type. To better achieve temperature uniformity, two thawing heaters 32 and 33 are provided and respectively situated within the cabinet space accessed by each doorway 25 and 26. The heaters are controlled by an adjustable thermostat (not shown) which may be set at appropriate thawing temperatures.

Figure 5:
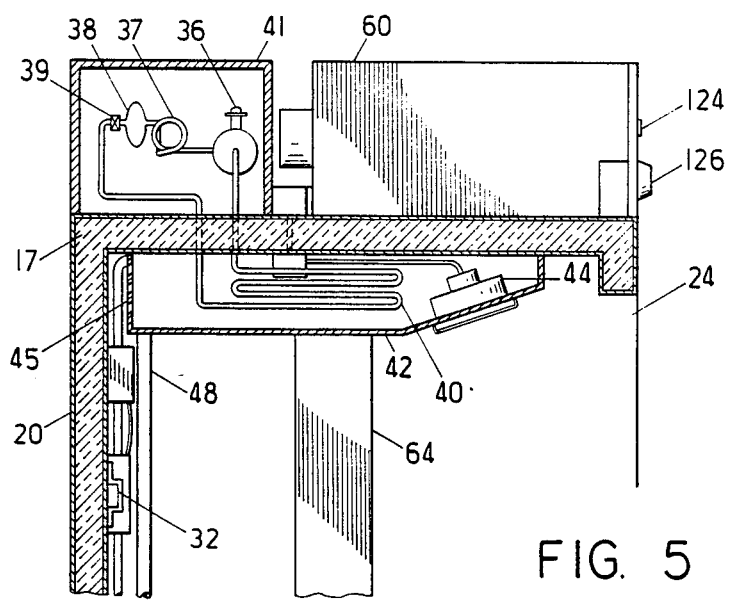
FIG. 5 is a longitudinal section through one end of a refrigeration unit.

The retarding means of the preferred embodiment is adapted to provide a selected retard temperature to bakery goods within the apparatus, and includes a vapor-compression refrigeration system having a compressor 36, condenser coils 37, liquid receiver 38, expansion valve 39 and cooling coils 40. The compressor 36, condenser coils 37, liquid receiver 38 and expansion valve 39 are shown schematically in FIGS. 5 and 6 outside of the cabinet space 24 and within a refrigeration compartment 41. As best shown in FIG. 5, the cooling coils 40 are located within the cabinet space 24 near the top wall 17 and are enclosed. To better achieve temperature uniformity and to accommodate the proofing means described below, two refrigeration enclosures 42 and 43 are provided and respectively situated at the top of the cabinet space accessed by each doorway 25 and 26. Each of the refrigeration enclosures 42 and 43 is fitted with front fans 44 and rear vents 45 so that during the retarding phase of operation of the bakery apparatus 15, air may be drawn over the cooling coils 40 and circulated within the cabinet space 24 to improve the temperature uniformity within the cabinet space. The front fans 44, the rear vents 45 and the thawing heaters 32 and 33 are situated such that the front fans can also improve the temperature uniformity during the thawing phase of the operation of the bakery apparatus 15. The refrigeration system is also controlled by an adjustable thermostat (not shown) which may be set at appropriate retarding temperatures. Drain pipes 48 and 49 respectively drain condensation which might form on the cooling coils within enclosures 42 and 43.

The proofing means is adapted to provide an atmosphere of selected temperature and humidity to bakery goods within the apparatus, and includes a steam generator unit 51 for supplying moisture to the air within the cabinet space 24. The steam generator 51 preferably is located near the floor 18 of the cabinet 16 and includes a boiler 52 situated on shelf 53 within the cabinet space 24. The boiler 52 has a boiler pan 54 for containing water. The boiler pan 54 as shown is removeable and easily accessible for cleaning. A water heater block 56 is mounted in pan 54 and is used for heating the water in pan 54. Heating elements 55, preferably formed of standard resistant wire (e.g., nichrome) are embedded within the water heating block 56. The block 56 is preferably aluminum and provides a regular surface which can distribute heat more evenly than the wires during the proofing phase and which can be more easily scoured and cleaned. As best shown in FIG. 1, the boiler 52 is laterally centered and runs longitudinally from near the front of the cabinet space 24 to near the rear of the cabinet space. As shown in FIG. 1 and confirmed by FIG. 4, the lateral extent of the preferred boiler 52 is chosen such that the boiler does not interfere with tray racks or tray carts which might be inserted directly through either doorway 25 or 26. Central braces 58 and 59 are provided to aid in positioning of racks or carts such that the boiler pan 54 is located to the side of all bakery trays.

Figure 6:
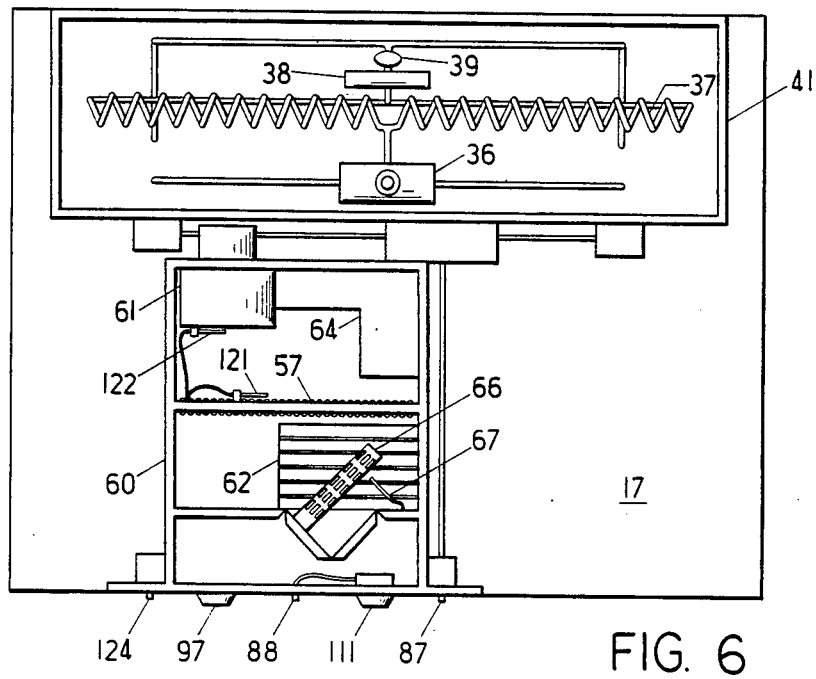
FIG. 6 is a top view of the bakery apparatus with the cover of the refrigeration cabinet and the air treatment control cabinet removed.

The proofing means also includes a proofing air heater 57 preferably of an electrical resistance type to ensure that the atmosphere within the bakery apparatus is tempered uniformly as to both temperature and humidity. During the proofing phase of operation, it is necessary to circulate the air through the apparatus, passing both the proofing air heater 57 and the boiler pan 54. Preferably, the position at which the circulating air is heated and the position in which the circulating air is humidified are at points of maximum separation in the path of circulation. The boiler 52 as described is located near the bottom of the apparatus while the heating of the air preferably occurs near the top of the apparatus. As shown in FIG. 6, proofing air heater 57 of the preferred embodiment is located within a control box 60 mounted above the top wall 17. Control box 60 also has a proofing fan 61. The interior of the control box 60 is isolated except for top vent 62 and duct 64 both of which connect the interior of the control box with the cabinet space 24. The top vent 62 extends between the control box interior and the top of the cabinet space 24 while the duct 64 extends from the casing of the fan 61, through the top wall 17 and down through the cabinet space 24 to just above the boiler 52. Preferably, the bottom portion of the duct 64 flares to form a hood 65 above the boiler pan 54. Thus, during the proofing phase of operation of the preferred bakery apparatus, air is heated in the control box and is driven downwardly through the duct 64 by the fan 61 such that it is distributed over the top of the boiler 52 thereby picking up moisture produced by evaporation of water within the bioler pan 54. The hot, moist air then rises from near the floor 18 upwardly within the cabinet space 24 and past the bakery goods therein. The circulating air is then drawn upward under action of the fan 61 through the top vent 62 and into the interior of the control box 60 where it can be reheated as necessary. Thus, the separation of the boiler 52 from the proofing air heater 57 results in moistened air being immediately caused to flow over the bakery goods without having to pass through any intervening ductwork. Condensation problems typically encountered in proofers which locate the boiler and air heater together at the top of the unit have therefore been substantially eliminated. Moreover, the air circulation pattern achieved during the proofing phase of operation has the additional advantage that the temperature of the heated air is modulated toward the ambiant cabinet space temperature as the air passes through the duct 64. This reduces the amount of excess moisture which might otherwise be picked up during humidification. This is again in contrast with conventional proofer designs in which heated air is immediately passed through a steam generator while it is able to support a relatively large quantity of water vapor. As such moisture-laden air passes into the interior of these conventional proofers, it cools and consequently releases a portion of the water vapor as unwanted condensation. The duct 64 of the preferred embodiment passes between the two refrigeration enclosures 42 and 43 and as best shown in FIG. 1 is confined to the area between the central braces 58 and 59. Thus, the duct does not interfere with tray racks or tray carts inserted through doorways 25 and 26, and any condensation on the duct will remain outside the area containing bakery goods.

An adjustable humidistat 66 of conventional commercial design is provided to control operation of the heating elements 55. Preferably, the humidistat 66 is mounted within the control box 60 just above the top vent 62 where it can sense the humidity of the air passing through the top vent. A temperature sensing probe 67 is provided to control operation of the proofing air heater 57 and is also preferably mounted just above the top vent 62 where it can sense the temperature of the air passing therethrough.

The bakery apparatus 15 is adapted to connect to a source of water under pressure (e.g., a municipal waterline) shown as the source line 70 in FIG. 2. The water from the source line 70 may also be conditioned by a conventional water softening apparatus. The source line 70 is connected to a supply line 71 which extends to the boiler pan 54. A solenoid controlled supply valve 72 is connected in supply line 71 and has an open position in which water flows to the boiler pan 54 and a closed position in which the flow of water is cut off. A discharge pan 73 is provided for collecting water to be discharged from the bakery apparatus 15. A discharge pipe 74 adapted to carry water from the boiler pan 54 extends from the boiler into the discharge pan 73, and a solenoid controlled discharge valve 75 is connected to the discharge pipe. Discharge valve 75 has an open position in which water may flow out of the boiler pan 54 through the discharge pipe and a closed position in which the flow of water through the discharge pipe is cut off. An overflow pipe 76 extends from an opening near the top of the boiler pan 54 to the discharge pan 73, thus preventing overfilling of the boiler pan and unnecessary leakage within the cabinet space 24. As best shown in FIGS. 1 and 2, the drain pipes 48 and 49 also discharge to the discharge pan 73. The discharge pan 73 may be connected to a conventional sewer line.

Figure 7:
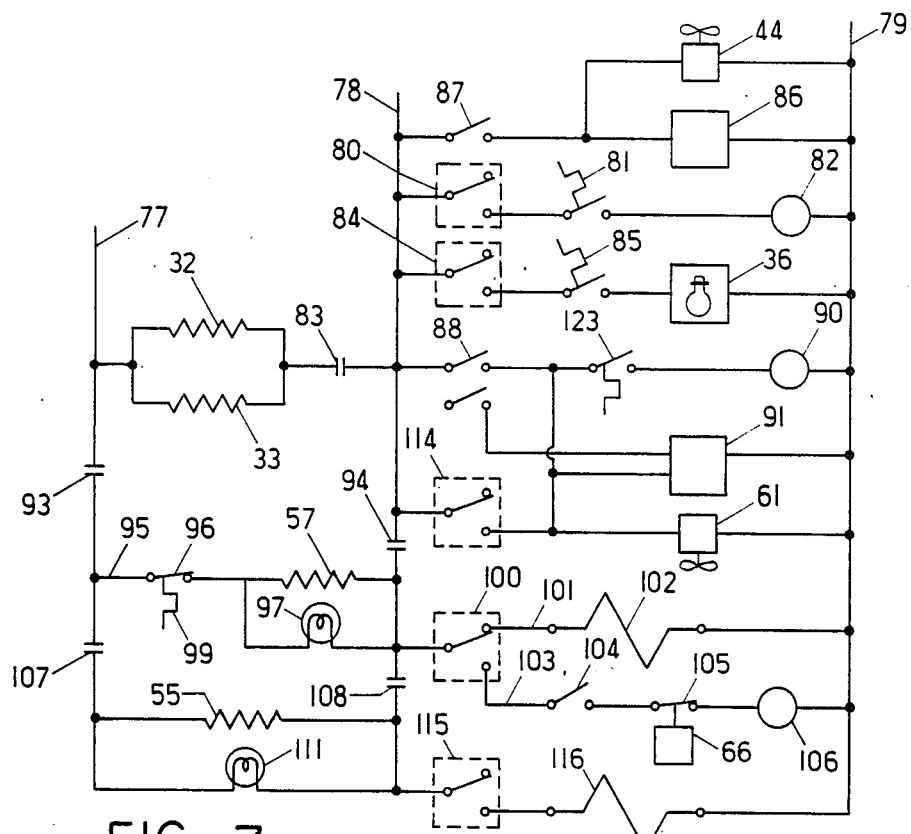
FIG. 7 is a schematic diagram of the electrical control system of the bakery apparatus.

Electrical control components of the bakery apparatus 15 are shown in the electrical schematic diagram of FIG. 7. Exemplary electronic circuitry for controlling the proofing cycle is disclosed in copending application Ser. No. 689,182, filed Jan. 7, 1985, which is incorporated herein by reference. Power is preferably supplied to the bakery apparatus 15 on standard two-phase, three-wire power lines represented in FIG. 7 by a negative phase hotline 77 (minus 120 volts), a positive hotline 78 (plus 120 volts) and a neutral line 79. Switch 80 is connected between power lines 78 and 79 and controls operation of the thawing phase control. Thermostatically controlled switch 81 is responsive to the temperature in the cabinet space 24 during thawing and controls, by means of relay coil 82, operation of the thawing heaters 32 and 33 connected between lines 77 and 78. When energized during the thawing phase relay coil 82 causes relay contact 83 to close. Switch 84 is also connected between power lines 78 and 79 and controls operation of the retarding phase control. Thermostatically controlled switch 85 is responsive to the temperature in the cabinet space 24 during retarding and controls operation of the compressor 36 during the retarding phase. While switches 80 and 84 may be independently operated, in the preferred embodiment they are both controlled through an adjustable thaw timer 86 which is activated by thawing power switch 87. In operation, closing switch 87 activates the thaw timer 86 which in turn closes switch 80 for the thawing time set by the operator. After the thaw time is passed, the thaw timer 86 causes switch 80 to open (thereby opening relay contact 83) and switch 84 to close, thereby beginning the retarding phase of operation. The retarding phase continues until switch 87 is opened by the operator at which time switch 84 is also caused to open. The front fans 44 of the preferred embodiment remain in operation during both the thawing and retarding phases and thus circulate air when either the thaw heaters 32 and 33, or the compressor 36 is activated.

A two-pole, single-throw, on-off proofing power switch 88 is also connected between power lines 78 and 79 and in its closed position supplies power through a high-temperature safety shut-off switch 123 to a main power relay coil 90. The switch 88 when closed also provides power to an adjustable flush timer 91, the operation of which is explained further below. Closing the switch 88 also supplies power to fan 61.

The energizing of relay coil 90 upon the closure of the proofing power switch 88 causes the main power relay contacts 93 and 94 to close, supplying 240 volt power on a line 95 through a thermostatically controlled switch 96 to the proofing air heater 57. When voltage is applied across the proofing air heater 57, a pilot light 97 is lit on the front panel 98 of the proofer. As explained further below, the switch 96 remains closed as the temperature of the air in the cabinet space 24, sensed by thermostat 99 within the temperature sensing probe 67, is below a proofing temperature selected by the operator. The switch 96 opens to cut off power to the proofing air heater 57 when the air temperature is over the selected temperature.

The closure of the relay contact 94 also provides power through a water level control relay switch 100 to either a line 101 connected to a solenoid 102 which operates the supply valve 72, or to a line 103 through a manual selection switch 104 and a humidistat controlled switch 105 to a humidity control relay coil 106. The position of the switch 100 is controlled by the flush timer 91 in response to the water level in the boiler pan 54. When the water level reaches a selected low level, the switch is in its position shown in FIG. 7. Power is supplied to the fill solenoid 102, opening the supply valve 72 and providing water to the boiler pan. When the water level in the boiler pan 54 reaches a selected hiqh level within the pan, switch 100 switches to its second position, supplying power to the line 103 and, if the switch 104 and the humidistat controlled switch 105 are closed, supplying power to the humidity control relay coil 106. When the relay coil 106 is energized, relay contacts 107 and 108 connected in the power lines 77 and 78 close to supply power to the water heating elements 55. A pilot light 111 on the front panel 98 is also connected between the lines 77 and 78 and lights when power is supplied to the heating elements 55. The humidistat 66 is connected to the control switch 105; it opens the switch 105 when the humidity within the proofer exceeds a selected humidity level and is otherwise closed. The opening of the switch 105 deenergizes the relay coil 106, opens the contacts 107 and 108, shuts off power to the water heating elements 55 and allows the water within the boiler pan 54 to cool down, thereby reducing the amount of water evaporated into the proofer. When the humidity in the proofer drops below the selected level, the humidistat 66 again closes the switch 105 and power is once more supplied to the heating elements 55 to heat the water within the boiler pan 54. When water has evaporated in the boiler pan to the point that the water level drops below the selected low level, the switch 100 is controlled to switch back to its first position, thereby cutting off power to the relay 106 and to the heating elements 55 and supplying power to the fill solenoid 102 to fill the boiler pan.

The cycle described above—of repeated filling of the boiler pan as necessary, and heating of the water within the boiler pan as necessary to maintain the desired humidity in the proofer chamber—continues for as long as the operator wishes the proofing operation to continue. At the end of the workday when the apparatus is to be shut down, the operator opens the proofing power switch 88 thereby cutting off the flow of power therethrough to the main power relay coil 90, the flush timer 91, and the fan 61. However, the flush timer 91 is so arranged that when power to it is cut off it causes switch 114 to close. Power is thus restored to the flush timer itself as well as to the main power relay coil 90 and the fan 61. The energizing of the main power relay coil 90 again causes the relay contacts 93 and 94 to close. In addition, the flush timer 91 also controls switch 115 causing it to switch from its open position as shown in FIG. 7 to a closed position in which it provides a connection from the line 78 to a solenoid 116 controlling the discharge valve 75. The flush timer 91 is structured to activate the switches 114 and 115 for a selected period of time (e.g., nine minutes has been found to be a satisfactory flushing period) after which the flush timer causes both switches 114 and 115 to open. However, during the period of time that switches 114 and 115 are closed, power is supplied to the proofing air heater in the normal manner, subject to the control of the thermostat switch 96, and the switch 100 is controlled in the normal manner to supply power either to the line 101, when the water level in the pan is below the selected low level, or to the line 103, when the water level in the boiler pan reaches the selected high level. When the water level is below the selected low level, and the switch 100 is in its position shown in FIG. 7, the solenoid 102 is energized to open the supply valve 72 to fill the boiler pan 54. When the water level reaches a selected high level, the switch 100 is switched to its second position, supplying power through the line 103, the switch 104, and the humidistat control switch 105 to the relay coil 106, closing the relay contacts 107 and 108. The closure of contacts 107 and 108 provides power to the heating elements 55 as in the normal proofing phase of operation. However, power is now also supplied through the switch 115 to the solenoid coil 116, thereby opening the discharge valve 75. Water now discharges from the boiler pan 54 into the discharge pan 73 until the water level within the boiler pan reaches the selected low level. It is noted that during this period of time, the heating elements 55 are supplied with power to heat the heating block 56 in which the heating elements 55 are embedded. When the water level drops below the selected low level, water is drained from the boiler pan, the switch 100 is switched to its upper position, deenergizing the coil 106, opening the contacts 107 and 108, and cutting off power to the heating elements 55 and to the discharge solenoid 116 thereby closing the discharge valve 75. The solenoid 102 is now energized, opening the supply valve 72 and filling up the boiler pan 54. This alternating cycle of supplying water to the boiler pan 54 and discharging water from the boiler pan, with the water heating block 56 within the boiler pan being heated during a portion of the cycle (preferably during the draining of the pan), continues for as long as the flush timer 91 remains activated. The intermittent heating of the water heating elements 55 and the heating block 56 during the flushing period heats the water adjacent to the block to both increase the solubility of minerals clinging to the block as well as to cause slight dimensional changes in the block of the boiler pan. These effects are believed to enhance the removal of residue during flushing. After the flush timer 91 times out, switches 114 and 115 are opened, cutting off power to the main power relay coil 90, opening the contacts 93 and 94, and consequently shutting off all power to all components of the proofing means.

A short, or high-water probe 117 and a long, or low-water probe 118 are the preferred means for respectively sensing the selected high-water level and selected low-water level within the boiler pan 54 during the proofing phase of operation. Each of the probes 117 and 118 has a metal core portion which extends downwardly into the water in the pan, and a surrounding insulating sleeve by which the probe is mounted to the boiler housing. A ground wire (not shown) is connected to the preferably metal boiler pan 54 so that electricity will be conducted from the probes through the water in the pan to the metal in the pan and thence to the ground when the water in the pan reaches the level of the metallic core portion of either of the probes.

The adjustable humidistat 66 (e.g. Sauter model HBC) is connected to the front panel 98 such that the operator may select the desired relative humidity during the proofing phase by adjusting dial 119. The temperature sensing probe 67 is connected to a thermostatic controller (e.g. Johnson Controls A19ACG-66) which is also connected to the front panel 98 and allows the operator to adjust the selected air temperature during the proofing phase by adjusting dial 120. Thermostatic excess temperature probes 121 and 122 are preferably mounted adjacent to the proofing air heater 57 and the intake of the fan 61 respectively to sense if excessive temperatures are reached at either location. If so, the excess temperature probes 121 and 122 are connected to a high temperature limit controller (e.g. Ranco Model GI-2506-00) to cause the switch 123 to open thereby shutting off power to the proofing air heater 57 and the heating elements 55. However, it is noted that the opening of the switch 123 does not cut off power to the flush timer 91 or to the fan 61. Thus the flush cycle is not activated and the fan continues to run while the air cools.

If the operator wishes to operate the proofing system without humidity control, the switch 104 is also accessible on the front panel 98 allowing manual cut-off of power to the water heater relay coil 106. Also on the control panel are the thawing power switch 87, a thaw timer adjustment dial 125 which allows an operator to set the time of thawing controlled by the thaw timer, the proofing power switch 88, and a flush timer adjustment dial 126 which allows an operator to set the duration of the flush cycle controlled by the flush timer. Optionally, a proofing timer 124 may be provided on the control panel 98 to allow the operator to preset a selected amount of time for proofing. The proofing timer 124, which may be a commercially available electrical timer, once set displays to the operator the length of time that the bakery goods have been proofing.

It is understood that the invention is not confined to the particular construction and arrangement of parts herein illustrated and described, but embraces such modified forms thereof as come within the scope of the following claims.

What is claimed is:

1. A bakery apparatus for retarding the cure of bakery goods comprising: a cabinet with a top wall, a floor, cabinet side walls extending between the top wall and the floor to define an interior cabinet space; access means for accessing the cabinet space from outside the cabinet; retarding means for retarding the cure of unfrozen bakery goods in the cabinet by refrigeration at a selected temperature; and proofing means for proofing the bakery goods which have been retarded in the cabinet by providing selected temperature and humidity to the goods for a selected period of time;

further including a thawing means for thawing frozen bakery goods by applying heat thereto before the goods are retarded; and wherein the thawing means includes an electrical resistance-type thawing heater; and further including an electrical control means, having a thawing power switch with an on position and an off position and a thermostat responsive to the temperature of the air within the apparatus for controlling the thawing heater such that when the temperature sensed by the thermostat during operation of the thawing means is below the selected temperature the thawing heater is provided with electric power and heated, and which electrical control means is responsive to switching of the thawing power switch from its off position to its on position, operating the thawing means for a selected period of time, whereafter the thawing means is shut off and the retarding means is switched on.

2. The bakery apparatus of claim 1 wherein the proofing means comprises:

(a) a boiler located within the cabinet space near the floor which generates water vapor to humidify the air in the apparatus during proofing;

(b) an air heater located near the top of the apparatus which generates heat to heat the air in the apparatus during proofing; and (c) means for directing air heated by the air heater from the top of the proofer over the boiler such that the air is humidified and then circulated within the apparatus back up to the air heater, whereby condensation of moisture from the humidified air within the apparatus during proofing is substantially minimized.

3. The bakery apparatus of claim 2 wherein the means for directing air includes a duct extending from the top of the apparatus to the top of the boiler and a fan mounted to the duct such that the air is driven from the top of the cabinet space past the air heater, through the duct and over the top of the boiler; and wherein the duct passes through the cabinet space such that the temperature of the air may be moderated toward ambient as the air is driven through the duct before the heated air passes over the boiler and receives water vapor therefrom.

4. The bakery apparatus of claim 2 wherein the air heater includes an electrical resistance heating element; and further including electrical control means, having a thermostat and is responsive to the temperature of the air within the apparatus during proofing, for controlling the air heater such that when the temperature sensed by the thermostat is below a selected temperature the electric air heater is provided with electric power and heated.

5. The bakery apparatus of claim 2 wherein the boilder includes a boiler pan for containing water and an electrical resistance heating element in the boiler pan for heating and evaporating water in the pan; and further including electrical control means, having a humidistat responsive to the humidity of the air within the apparatus during proofing, for controlling the boiler pan heating element such that when the humidity is below a selected humidity level, the boiler pan heating element is provided with electrical power and heated.

6. The bakery apparatus of claim 5 further comprising a water supply line running to the boiler pan and adapted to be connected to a source of water under pressure; a solenoid operated supply valve mounted within the supply line and having an open position in which water flows to the boiler pan and a closed position in which the flow of water is cut off; a drain pipe extending from the boiler pan and adapted to convey water from the boiler pan; a solenoid operated drain valve connected within the drain pipe and having an open position allowing flow through the drain pipe and a closed position in which the flow therethrough is cut off; and wherein the electrical control means further includes a proofing power switch with an on position and an off position and is responsive to switching of the proofing power switch from its on position to its off position, by controlling the supply valve and drain valve to alternately open the supply valve while the drain valve is closed and open the drain valve while the supply valve is closed to flush the boiler pan for a selected period of time, whereafter the electrical control means shuts off.

7. The bakery apparatus of claim 6 wherein the boiler pan heating element is heated for a portion of the time that the boiler pan is being flushed.

8. The bakery apparatus of claim 1 wherein the proofing means includes
(a) a boiler for generating steam within the cabinet space which includes a boiler pan for containing water;
(b) a water supply line running to the boiler pan and adapted to be connected to a source of water under pressure;
(c) a solenoid operated supply valve connected to the water supply line and having an open position in which water flows to the boiler pan and a closed position in which the flow of water is cut off;
(d) a drain pipe extending from the boiler pan and adapted to convey water from the boiler pan; and
(e) electrical control means, including a proofing power switch with an on position and an off position and a flush timer responsive to switching of the proofing power switch from its on position to its off position, for controlling the supply valve such that water flows to the boiler pan and is conveyed from the boiler pan for a selected flushing time period after the proofing power switch is shut off, thereby flushing the boiler pan at the end of the proofing cycle.

9. The bakery apparatus of claim 8 further including a solenoid operated drain valve connected in the drain pipe having an open position in which water flows out of the boiler pan through the drain pipe and a closed position in which the flow of water through the drain pipe is cut off; and wherein the electrical control means controls the drain valve to open it for at least part of the flushing time period.

10. The bakery apparatus of claim 9 wherein the electrical control means is responsive to the water level in the boiler pan and wherein the supply valve and the drain valve are controlled by the electrical control means such that there is an alternating filling and draining of the boiler pan during the flushing time period.

11. The bakery apparatus of claim 8 wherein the boiler further includes a water heating element in the boiler pan for heating the water in the boiler pan and wherein the heating element is heated for a portion of the flushing time period and the heating element is not heated for a portion of the flushing time period.

12. The bakery apparatus of claim 8 wherein the electrical control means is responsive to the water level in the boiler pan, and wherein, when the proofing power switch is on, the supply valve is controlled such that whenever the water level in the pan reaches a selected low level, the boiler pan is filled with water to a selected high level.

13. The bakery apparatus of claim 8 further including an electric resistance-type-air heater to heat the air in the apparatus during the proofing cycle, and wherein the electrical control means has a thermostat and is responsive to the temperature of the air within the apparatus during proofing, controlling the air heater such that when the temperature sensed by the thermostat is below a selected temperature the electric air heater is provided with electric power and heated.

14. The bakery apparatus of claim 13 wherein the boiler is located near the floor of the apparatus; wherein the proofing air heater is located near the top of the apparatus; and wherein the apparatus further includes means for directing air heated by the air heater downward from the top of the apparatus to over the boiler such that the air is humidified and circulated within the apparatus and condensation within the apparatus during proofing is substantially minimized.

15. The bakery apparatus of claim 14 wherein the means for directing air includes a duct extending from the top of the apparatus to the boiler, and a fan mounted to the duct such that air is driven from the top of the proofer past the air heater, through the duct and over the top of the boiler; and wherein the duct passes through the cabinet space such that the temperature of the air may be moderated as it is driven through the duct, thereby minimizing condensation of moisture within the duct.

16. The bakery apparatus of claim 8 wherein the boiler further includes an electrical resistance-type heating element for heating and evaporating water in the pan; wherein the electrical control means further includes a humidistat; and wherein the electrical control means is responsive to the humidity of the air within the apparatus during proofing, controlling the boiler pan heating element such that when the humidity is below a selected humidity level, the boiler pan heating element is provided with electrical power and heated.

17. The bakery apparatus of claim 16 wherein the heating element is heated for at least a portion of the flushing time period when the humidity is below the selected humidity.

18. The bakery apparatus of claim 8 further comprising a thawing means for thawing frozen bakery goods.

19. The bakery apparatus of claim 18 wherein the thawing means includes an electrical resistance-type thawing heater; and wherein the electrical control means has a thawing power switch with an on position and an off position, and a thermostat; and wherein the electrical control means is responsive to the temperature of the air within the apparatus, controlling the thawing heater such that when the temperature sensed by the thermostat during operation of the thawing means is below the selected temperature the thawing heater is provided with electric power and heated, and the electrical control means is responsive to switching of the thawing power switch from its off position to its on position, operating the thawing means for a selected period of time, whereafter the thawing means is shut off and the retarding means is switched on.

20. A bakery apparatus for thawing, retarding and proofing bakery goods comprising:
(a) a cabinet having a top wall, a floor, cabinet side walls extending between the top wall and the floor to define an interior cabinet space and access means for accessing the cabinet space from outside the cabinet;
(b) a thawing air heater for heating the air within the apparatus to thaw bakery goods within the apparatus;
(c) a refrigeration system for cooling the air within the apparatus to retard the cure of bakery goods within the apparatus;
(d) a boiler and a proofing air heater for providing an atmosphere of selected temperature and humidity to proof bakery goods within the apparatus;
(e) electrical control means, responsive to the temperature of the air within the apparatus during thawing, retarding and proofing, and responsive to the humidity of the air within the apparatus during proofing, for controlling the thawing air heater such that when the temperature of the air is below a selected thawing temperature during thawing, the thawing air heater is provided with electric power and the air is heated, controlling the refrigeration system such that when the temperature of the air is above a selected retarding temperature during retarding, the refrigeration system is provided with electrical power and the air is cooled, controlling the proofing air heater such that when the temperature of the air is below a selected proofing temperature during proofing, the proofing air heater is provided with electrical power and the air is heated, and controlling the boiler such that when the humidity of the air is below a selected humidity during proofing, water is evaporated from the boiler to humidify the air.

21. The bakery apparatus of claim 20 wherein the electrical control means has a thawing power switch with an on position and an off position and is responsive to switching the thawing power switch from its off position to its on position, thawing the bakery goods for a selected thawing period of time, whereafter thawing ceases, and the bakery goods are retarded.

22. The bakery apparatus of claim 20 wherein the refrigeration system includes a refrigeration enclosure, cooling coils within the refrigeration enclosure, cooling fans for directing air over the cooling coils, and air vents for venting cooled air from the cooling enclosure for circulation throughout the cabinet space.

23. The bakery apparatus of claim 22 wherein the thawing air heater is located near the air vent, and wherein the cooling fans operate during thawing such that warm air is circulated through the cabinet space during thawing.

24. The bakery apparatus of claim 20 wherein the boiler is located near the floor and the proofing air heater is located near the top of the apparatus; and further including means for directing air heated by the proofing air heater from the top of the apparatus downwardly over the boiler such that the air is humidified and then circulated within the proofer back up to the air heater.

25. The bakery apparatus of claim 20 wherein the boiler has a boiler pan for holding water and a heating element in the pan to generate water vapor; further comprising a water supply line adapted to be connected to a source of water under pressure extending to the boiler pan; a water supply valve mounted within the water supply line, response to a central signal, and having an open position in which water flows to the pan and a closed position in which the flow of water is cut off; a drain pipe extending from the boiler pan to convey water therefrom; a drain valve connected in the drain pipe, responsive to a control signal and having an open position in which water can drain from the boiler pan and a closed position in which the flow of water through the drain pipe is cut off; and a means for sensing the level of the water in the boiler pan and providing output signal indicative thereof; and wherein the electrical control means includes a proofing power switch with on and off positions and controls the supply valve to supply water to the boiler pan when the water level in the pan is below a selected low level, closes the supply valve when the water within the pan is above a selected high level, and responds to the switching of the proofing power switch from its on position to its off position by controlling the supply valve and drain valve to flush fresh water through the boiler pan and over the water heating element for a selected period of time after the proofing switch is switched off and thereafter closing both valves.

26. The bakery apparatus of claim 25 wherein the control means controls the supply valve and the drain valve during the flushing time period such that the supply valve is opened while the drain valve is closed to supply water to the boiler pan until the water in the pan reaches a selected high level, whereafter the supply valve is closed and the drain valve is opened to drain water from the boiler pan until the water in the pan reaches a selected low level, whereafter the drain valve is closed and the supply valve opened and the cycle repeated during the selected flushing time period.

27. The bakery apparatus of claim 26 wherein, during the flushing time period, the control means supplies power to the heating element in the boiler pan when the drain valve is open and cuts off power thereto when the drain valve is closed.

28. The bakery apparatus of claim 25 wherein the means for sensing the water level within the boiler pan comprises a low water level electrical probe and a high water level electrical probe, the low water probe having a downwardly extending metal core which terminates at a selected low level position spaced above the bottom of the pan, and a high water level probe having a downwardly extending metal core which terminates at a selected high level position spaced farther above the bottom of the boiler pan than the low water level probe core, both of the probes having electrical wires connected to their cores for completing an electrical circuit therethrough to the water in the pan when the water contacts the metal core portions.

29. A bakery apparatus for retarding the cure of bakery goods comprising: a cabinet with a top wall, a floor, cabinet side walls extending between the top wall and the floor to define an interior cabinet space; access means for accessing the cabinet space from outside the cabinet; retarding means for retarding the cure of unfrozen bakery goods in the cabinet by refrigeration at a selected temperature; and proofing means for proofing the bakery goods which have been retarded in the cabinet by providing selected temperature and humidity to the goods for a selected period of time; wherein the proofing means comprises:
  (a) a boiler located within the cabinet space near the floor which generates water vapor to humidify the air in the apparatus during proofing;
  (b) an air heater located near the top of the apparatus which generates heat to heat the air in the apparatus during proofing; and
  (c) means for directing air heated by the air heater from the top of the proofer over the boiler such that the air is humidified and then circulated within the apparatus backup to the air heater, whereby condensation of moisture from the humidified air within the apparatus during proofing is substantially minimized.

30. The bakery apparatus of claim 29 wherein the means for directing air includes a duct extending from the top of the apparatus to the top of the boiler and a fan mounted to the duct such that the air is driven from the top of the cabinet space past the air heater, through the duct and over the top of the boiler; and wherein the duct passes through the cabinet space such that the temperature of the air may be moderated toward ambient as the air is driven through the duct before the heated air passes over the boiler and receives water vapor therefrom.

31. The bakery apparatus of claim 29 wherein the air heater includes an electrical resistance heating element;

and further including electrical control means, having a theremostat and is responsive to the temperature of the air within the apparatus during proofing, for controlling the air heater such that when the temperature sensed by the thermost is below a selected temperature the electric air heater is provided with electric power and heated.

32. The bakery apparatus of claim 29 wherein the boiler includes a boiler pan for containing water and an electrical resistance heating element in the boiler pan for heating and evaporating water in the pan; and further including electrical control means, having a humidistat responsive to the humidity of the air within the apparatus during proofing, for controlling the boiler pan heating element such that when the humidity is below a selected humidity level, the boiler pan heating element is provided with electrical power and heated.

33. The bakery apparatus of claim 32 further comprising a water supply line running to the boiler pan and adapted to be connected to a source of water under pressure; a solenoid operated supply valve mounted within the supply line and having an open position in which water flows to the boiler pan and a closed position in which the flow of water is cut off; a drain pipe extending from the boiler pan and adapted to convey water from the boiler pan; a solenoid operated drain valve connected within the drain pipe and having an open position allowing flow through the drain pipe and a closed position in which the flow therethrough is cut off; and wherein the electrical control means further includes a proofing power switch with an on position and an off position and is responsive to switching of the proofing power switch from its on position to its off position, by controlling the supply valve and drain valve to alternately open the supply valve while the drain valve is closed and open the drain valve while the supply valve is closed to flush the boiler pan for a selected period of time, whereafter the electrical control means shuts off.

34. The bakery apparatus of claim 33 wherein the boiler pan heating element is heated for a portion of the time that the boiler pan is being flushed.

35. A bakery apparatus for retarding the cure of bakery goods comprising: a cabinet with a top wall, a floor, cabinet side walls extending between the top wall and the floor to define an interior cabinet space; access means for accessing the cabinet space from outside the cabinet; retarding means for retarding the cure of unfrozen bakery goods in the cabinet by refrigeration at a selected temperature; and proofing means for proofing the bakery goods which have been retarded in the cabinet by providing selected temperature and humidity to the goods for a selected period of time; wherein the proofing means includes
 (a) a boiler for generating steam within the cabinet space which includes a boiler pan for containing water;
 (b) a water supply line running to the boiler pan and adapted to be connected to a source of water under pressure;
 (c) a solenoid operated supply valve connected to the water supply line and having an open position in which water flows to the boiler pan and a closed position in which the flow of water is cut off;
 (d) a drain pipe extending from the boiler pan and adapted to convey water from the boiler pan; and
 (e) electrical control means, including a proofing power switch with an on position and an off position and a flush timer responsive to switching of the proofing power switch from its on position to its off position, for controlling the supply valve such that water flows to the boiler pan and is conveyed from the boiler pan for a selected flushing time period after the proofing power switch is shut off, thereby flushing the boiler pan at the end of the proofing cycle.

36. The bakery apparatus of claim 35 further including a solenoid operated drain valve connected in the drain pipe having an open position in which water flows out of the boiler pan through the drain pipe and a closed position in which the flow of water through the drain pipe is cut off; and wherein the electrical control means controls the drain valve to open it for at least part of the flushing time period.

37. The baker apparatus of claim 36 wherein the electrical control means is responsive to the water level in the boiler pan and wherein the supply valve and the drain valve are controlled by the electrical control means such that there is an alternating filling and draining of the boiler pan during the flushing time period.

38. The bakery apparatus of claim 35 wherein the boiler further includes a water heating element in the boiler pan for heating the water in the boiler pan and wherein the heating element is heated for a portion of the flushing time period and the heating element is not heated for a portion of the flushing time period.

39. The bakery apparatus of claim 35 wherein the electrical control means is responsive to the water level in the boiler pan, and wherein, when the proofing power switch is on, the supply valve is controlled such that whenever the water level in the pan reaches a selected low level, the boiler pan is filled with water to a selected high level.

40. The bakery apparatus of claim 35 further including an electric resistance-type air heater to heat the air in the apparatus during the proofing cycle, and wherein the electrical control means has a thermostat and is responsive to the temperature of the air within the apparatus during proofing, controlling the air heater such that when the temperature sensed by the thermostat is below a selected temperature the electric air heater is provided with electric power and heated.

41. The bakery apparatus of claim 40 wherein the boiler is located near the floor of the apparatus; wherein the proofing air heater is located near the top of the apparatus; and wherein the apparatus further includes means for directing air heated by the air heater downward from the top of the apparatus to over the boiler such that the air is humidified and circulated within the apparatus and condensation within the apparatus during proofing is substantially minimized.

42. The bakery apparatus of claim 41 wherein the means for directing air includes a duct extending from the top of the apparatus to the boiler, and a fan mounted to the duct such that air is driven from the top of the proofer past the air heater, through the duct and over the top of the boiler; and wherein the duct passes through the cabinet space such that the temperature of the air may be moderated as it is driven through the duct, thereby minimizing condensation of moisture within the duct.

43. The bakery apparatus of claim 35 wherein the boiler further includes an electrical resistance-type heating element for heating and evaporating water in the pan; wherein the electrical control means further includes a humidistat; and wherein the electrical control means is responsive to the humidity of the air within the apparatus during proofing, controlling the boiler pan heating element such that when the humidity is below a selected humidity level, the boiler pan heating element is provided with electrical power and heated.

44. The bakery apparatus of claim 43 wherein the heating element is heated for at least a portion of the flushing time period when the humidity is below the selected humidity.

45. The bakery apparatus of claim 35 further comprising a thawing means for thawing frozen bakery goods.

46. The bakery apparatus of claim 45 wherein the thawing means includes an electrical resistance-type thawing heater; and wherein the electrical control means has a thawing power switch with an on position and an off position, and a thermostat; and wherein the electrical control means is responsive to the temperature of the air within the apparatus, controlling the thawing heater such that when the temperature sensed by the thermostat during operation of the thawing means is below the selected temperature the thawing heater is provided with electric power and heated, and the electrical control means is responsive to switching of the thawing power switch from its off position to its on position, operating the thawing means for a selected period of time, whereafter the thawing means is shut off and the retarding means is switched on.

* * * * *